3,459,827
POLYMERIZATION PROCESS
Edward T. Child, Fishkill, N.Y., and George F. Pezdirtz, Newport News, Va., assignors to Texaco Inc., New York, N.Y., a corporation of Delaware
No Drawing. Filed July 8, 1965, Ser. No. 470,568
Int. Cl. C07c *3/18;* C08f *1/72, 3/14*
U.S. Cl. 260—683.15                                                5 Claims

ABSTRACT OF THE DISCLOSURE

Continuous liquid phase process for polymerizing 100% isoolefin to 800 to 4000 molecular weight polyisoolefin with titanium tetrachloride at 35 to 175° F. in a coil reactor.

---

This invention relates to olefin polymerization and, more particularly, to an improved method for polymerizing monoisoolefins, such as isobutylene and the like.

Presently known commercial processes for the production of polyisobutylene from isobutylene monomer are based on the use of aluminum trichloride or boron trifluoride as the catalyst. These processes employ an inert hydrocarbon or halogenated hydrocarbon diluent in order to moderate or reduce the rate of the polymerization reaction brought about by the above-noted catalysts. They also require extensive refrigeration in order to further control the highly exothermic reaction and produce polymers of the desired molecular weight. Due to the necessity of controlling the reaction in the noted ways, and the concomitant requirement of separating and recovering the solvent, the known processes do not provide the most economical route for the production of polyisoolefins.

A method has now been discovered which eliminates or substantially reduces uneconomical aspects of these commercial polymerization processes.

In accordance with this invention, an isoolefin monomer in the liquid phase and in the absence of an added diluent is reacted under polymerization conditions in the presence of or in contact with liquid titanium tetrachloride as the catalyst in a confined elongated reaction zone at a temperature in the range of 35° to 175° F. and a pressure sufficient to maintain the reactants in the liquid phase until no more than 75 weight percent of said monomer isoolefin has been polymerized by rapidly deactivating said polymerization catalyst in the reaction mixture to meet said limit and recovering a polyisoolefin having a number average molecular weight in the range of 800 to 4000. The residence time to effect such a reaction is generally a period from about 10 to 60 minutes. The titanium tetrachloride catalyst is employed without a solvent or diluent as well as the isoolefin feed. The operativeness of this process is critically dependent on the procedure employed and on the particular combination of operating conditions selected.

The feed stream for this process is a monoolefin, more particularly, a monoisoolefin. In general, isoolefins having from 4 to 10 carbon atoms may be employed with isobutylene and isoamylene being the preferred isoolefin feed materials for this process. Mixed isoolefin feeds may, of course, also be employed. Olefins not having a tertiary linkage are not suitable for and ineffective in this process.

It is essential that the process be conducted under sufficient pressure to maintain the feed isoolefin and the reaction mixture in the liquid phase. No advantage is realized by employing a pressure above the minimum pressure required to insure a liquid phase process. As an example, isobutylene is kept in the liquid phase at a pressure of 28 p.s.i.g. at 75° F. and at a pressure of 115 p.s.i.g. at 150° F. Similarly α-isoamylene is kept in the liquid phase at a pressure of 3 p.s.i.g. at 75° F. and 45 p.s.i.g. at 150° F. It will be appreciated that the reaction mixture containing polyisoolefins which have higher molecular weight and boil higher than the isoolefin feed will always be in the liquid phase at the temperature and pressure which keeps the feed isoolefin in the liquid phase.

The use of titanium tetrachloride as the polymerization catalyst is a critical feature of this process. Conventional polymerization catalysts, such as boron fluoride and aluminum chloride, are so reactive with undiluted isoolefin that they cannot be controlled and render the process inoperative by blocking the reactor with high molecular weight polymers. Conversely, polymerization catalysts that are substantially slower than titanium tetrachloride are ineffective for producing economically practical or useful yields of the desired polymers.

The titanium tetrachloride catalysts, a liquid under the conditions employed, is used without a solvent or diluent when it is contacted with the isoolefin. Thus, the instant process is characterized by the fact that it is a completely liquid phase process in all stages from beginning to end and that no diluent or solvent is added at any stage of the process either with the catalyst or with the isoolefin feed. Obvious advantages present in this process are that there are no solvent costs incurred, no processing steps to recover the solvent and the fact that a substantially larger product throughput is obtained for a given piece of equipment.

Because no diluent or solvent is employed, certain of the conditions for conducting the process are critical in order to maintain the operativeness of the process. The catalyst and the isoolefin, for example, must be continuously mixed in the stated proportions in making up the feed for the reaction. This is best effected with the aid of a metering device which can be set to feed and mix the catalyst with the isoolefin at the desired rate. With a meter, the liquid titanium tetrachloride is continuously admixed with the liquid isoolefin at a rate of about 0.2 to 3% by weight of catalyst based on the weight of said isoolefin.

It is an essential feature of this process that it be conducted in a reactor which substantially minimizes any tendency for the reaction product to back-mix with the fresh feed. This is realized by conducting the reaction in a reactor wherein the isoolefin is confined and is continuously and positively moved away from the point where the catalyst and isoolefin were mixed and the reaction initiated. A coil-type reactor wherein the reactant is passed into a coil of relatively small cross-sectional diameter and is continuously passed through the coil thereby minimizing mixing of the products with the feed is particularly effective. The coil reactor is basically a confined elongated reaction zone with a feed point or input opening and the exit or product opening marking the extremes of a non-backmixing reactor.

The instant process is conducted at a moderately elevated temperature to obtain polymers in the number average of molecular weight range of 800 to 4000, and preferably in the 1000 to 3000 molecular weight range. Broadly, the reaction or polymerization temperature ranges from about 35° to about 175° F. with the preferred temperature range being from about 50° to 150° F. Temperatures below about 35° F. will cause plugging of the reactor and render the process inoperative, while temperatures above the upper temperature limit produce undesirable low molecular weight polymers. Experience has shown that the desired temperature may be maintained with the aid of cooling water in contact with the reactor. This is a highly advantageous and economicaly feature of the process since, as noted above, commercial processes must rely on extensive dilution of the feed as well as extensive cooling to provide an operative process.

In order to insure that a liquid, fluid polymerization reaction product is maintained in the reactor, in other words to prevent the formation of excessive amounts of viscous to solid polymers which would plug the reactor and render it inoperative, it is critical that the reaction be stopped at a certain point during the reaction. Specifically the reaction must be stopped when no more than 75 percent by weight, preferably below about 65 percent of the isoolefin monomer has polymerized. This is done by injecting a catalyst deactivator into the reaction mixture to deactivate the titanium tetrachloride catalyst when the reaction has gone to the indicated extent.

The foregoing limit is critical for the reason that no added diluent or solvent is employed in this process and the fact that the polyisoolefins having molecular weights in the range of 800 to 4000 are extremely viscous products. The unreacted isoolefin monomer amounting to 25 percent or more of the feed monomer is a liquid having a low viscosity and insures the fluidity of the effluent stream containing the viscous polymer products. If polymerization goes beyond the 75% limit the reactor becomes plugged up and rendered completely inoperative.

The residence time for the isoolefin feed stream in the reactor is generally a time in the range of 10 to 60 minutes with a residence time period from about 20 to 40 minutes being preferred. Expressed in terms of liquid hourly space velocities, the process throughput is from 1 to 6 liquid hourly space velocities.

A base or basic reacting material is preferably employed to deactivate the titanium tetrachloride catalyst in the effluent. Suitable deactivators include sodium hydroxide, potassium hydroxide, anhydrous ammonia and the like. Anhydrous ammonia is particularly preferred as the deactivator since it forms an insoluble complex with titanium tetrachloride and is relatively easily separated from the product-containing effluent by filtration. The use of an agent which produces an inactive complex with the catalyst can also be used. For example, alcohols, such as ethyl alcohol and even excess water.

After the catalyst has been removed from the product effluent, the effluent is passed into a separator, desirably a flasher, wherein unreacted isobutylene is flashed overhead and the high molecular weight polymer is recovered as a bottoms fraction. The flashed isobutylene is sufficiently pure that it can be recycled directly into the isoolefin feed stream.

The following examples illustrate the practice of this invention.

EXAMPLE I

100% isobutylene containing no solvent or diluent was continuously fed into a coil reactor in the liquid phase under 120 p.s.i.g. into contact with undiluted liquid titanium tetrachloride. A 1% concentration of titanium tetrachloride was maintained by continuously matering the catalyst into the isobutylene feed. The reaction mixture was maintained in the liquid phase at a temperature of about 75° F. and a pressure of 120 p.s.i.g. The rate of feed was such that the residence time in the reactor was 30 minutes which is equivalent to a 2 liquid hourly space velocity. As the reaction product emerged from the reactor, the catalyst was deactivated with anhydrous ammonia. After separation of the catalyst and of unreacted isobutylene, a polymer yield of 61% was obtained having a number average molecular weight of 2600. Approximately 60 lbs. of polymer were obtained per pound of titanium tetrachloride consumed indicating that a high catalyst efficiency was obtained.

EXAMPLE II

Undiluted isobutylene in the liquid phase under 120 p.s.i.g. was continuously mixed with 1% by weight of undiluted liquid titanium tetrachloride based on said isobutylene and reacted in a coil reactor in which the reaction mixture was maintained in the liquid phase at a temperature of about 150° F. and a pressure of 120 p.s.i.g., and a residence time of 30 minutes which is equivalent to a 2 liquid hourly space velocity in a manner similar to Example I above. The yield of polyisobutylene was 70% having a number average molecular weight of 1070.

The foregoing examples show that a 100% isoolefin feed can be polymerized in the liquid phase in a tubular type reactor with both a high yield of polymer and high catalyst efficiency by following the critical process conditions.

Many modifications and variations of the invention as hereinbefore set forth may be made without departing from the spirit and scope thereof, and only such limitations should be imposed as are indicated in the appended claims.

We claim:

1. A continuous liquid phase method for producing a polyisoolefin having a molecular weight in the range of 800 to 4000 which comprises continuously feeding undiluted isoolefin under sufficient pressure to maintain said isoolefin in the liquid phase and undiluted liquid titanium tetrachloride in admixture into a confined elongated reaction zone, the amount of said catalyst based on the weight of said isoolefin being in the range of 0.2 to 3%, and reacting said isoolefin-titanium tetrachloride reaction mixture in said reaction zone at a temperature in the range of 35° to 175° F. under a pressure sufficient to maintain said reaction mixture in the liquid phase and in the absence of any added diluent until no more than 75 percent of said isoolefin has polymerized, stopping said reaction by adding a catalyst deactivator and recovering a polyisoolefin product.

2. A method according to claim 1, in which said reaction is effected at a temperature in the range of 50° to 150° F. until less than about 65 percent of said isoolefin has been polymerized.

3. A method according to claim 1 in which said reaction zone is a coil type reactor.

4. A continuous liquid phase method for producing a polyisobutylene having a molecular weight in the range of 800 to 4000 which comprises continuously feeding undiluted isobutylene under sufficient pressure to maintain said isobutylene in the liquid phase and undiluted liquid titanium tetrachloride into a confined elongated reaction zone, the amount of said catalyst based on the weight of said isobutylene being in the range of 0.2 to 3% and reacting said isobutylene titanium tetrachloride reaction mixture in said reaction zone at a temperature in the range of 35° to 175° F. under a pressure sufficient to maintain said reaction mixture in the liquid phase and in the absence of any added diluent until no more than 75 percent of said isobutylene has polymerized, stopping said reaction by adding a catalyst deactivator and recovering a polyisobutylene product.

5. A continuous liquid phase method for producing a polyisobutylene having a number average molecular weight in the range of 1000 to 3000 which comprises continuously feeding undiluted isobutylene under sufficient pressure to maintain said isobutylene in the liquid phase and undiluted titanium tetrachloride catalyst into a coil type reactor, the amount of such catalyst based on the weight of said isobutylene being in the range of 0.2 to 3% and reacting said isobutylene-titanium tetrachloride reaction mixture in said reactor at a temperature in the range of 50° to 150° F. under a pressure sufficient to maintain said reaction mixture in the liquid phase and in the absence of any added diluent until no more than 75 percent of said isobutylene has polymerized, stopping said reaction by adding a catalyst deactivator, separating said deactivated catalyst and recovering a polyisobutylene product.

References Cited

UNITED STATES PATENTS

| | | |
|---|---|---|
| 2,065,474 | 12/1936 | Mueller-Cunradi et al. |
| 2,363,221 | 11/1944 | Bannon. |
| 2,657,246 | 10/1953 | Schneider et al. |
| 2,918,508 | 12/1959 | Coopersmith et al. |
| 3,109,041 | 10/1963 | Child et al. _____ 260—683.15 |
| 3,242,158 | 3/1966 | Child et al. _____ 260—94.8 |

PAUL M. COUGHLAN, Jr., Primary Examiner